United States Patent
Diehl

(10) Patent No.: US 9,602,889 B2
(45) Date of Patent: Mar. 21, 2017

(54) METHOD AND A DEVICE FOR SELECTING A PARTICIPATING DEVICE

(71) Applicant: THOMAS LICENSING, Issy de Moulineaux (FR)

(72) Inventor: Eric Diehl, Issy les Moulineaux (FR)

(73) Assignee: Thomson Licensing, Issy-les-Moulineaux (FR)

(*) Notice: Subject to any disclaimer, the term of this patent is extended or adjusted under 35 U.S.C. 154(b) by 0 days.

(21) Appl. No.: 14/608,160

(22) Filed: Jan. 28, 2015

(65) Prior Publication Data
US 2015/0215682 A1    Jul. 30, 2015

(30) Foreign Application Priority Data
Jan. 29, 2014   (EP) ..................................... 14305115

(51) Int. Cl.
*H04N 21/81* (2011.01)
*H04N 21/8358* (2011.01)
(Continued)

(52) U.S. Cl.
CPC ..... *H04N 21/8358* (2013.01); *G07F 17/3295* (2013.01); *H04H 20/31* (2013.01); *H04H 60/33* (2013.01); *H04H 60/37* (2013.01); *H04H 60/58* (2013.01); *H04H 60/59* (2013.01); *H04H 60/65* (2013.01); *H04M 1/72544* (2013.01); *H04N 21/4758* (2013.01); *H04N 21/4781* (2013.01);
(Continued)

(58) Field of Classification Search
CPC ........... H04N 21/4781; H04N 21/4758; H04N 21/4784; H04N 21/8173; H04N 21/8186; H04N 21/8358; H04M 1/72544
See application file for complete search history.

(56) References Cited

U.S. PATENT DOCUMENTS

| 8,197,333 B2 | 6/2012 | Diehl et al. |
| 2005/0086697 A1 | 4/2005 | Haseltine |

(Continued)

FOREIGN PATENT DOCUMENTS

| AU | 2002326526 | 8/2002 |
| AU | 2005239676 | 11/2005 |
| WO | WO2010054222 | 5/2010 |

OTHER PUBLICATIONS

Deruvo : "Media Echo brings Bonus Features to your tablet—Doddle", Dec. 16, 2011 (Dec. 16, 2011), pp. 1-2.
Search Report Dated May 23, 2014.

*Primary Examiner* — Hai V Tran
*Assistant Examiner* — Jason Thomas
(74) *Attorney, Agent, or Firm* — Myers Wolin LLC

(57) ABSTRACT

A main screen renders watermarked content. A remote device captures a watermark and extracts a payload comprising a layout type, displays possible answers according to the layout type and receives a response from a user. The remote device captures a further watermark and extracts a payload comprising a correct answer, a ratio value and a token value. If the correct answer is equal to the answer received from the user, the remote device generates a comparison value, compares the comparison value and a ratio value extracted from the payload and, if the comparison between the comparison value and the ratio value indicates that remote device has been selected, displays a message intended to a user. The remote device can further generate a value from at least the token value and display this value as proof of being selected.

13 Claims, 3 Drawing Sheets

(51) Int. Cl.
*H04N 21/475* (2011.01)
*H04N 21/478* (2011.01)
*H04N 21/488* (2011.01)
*H04N 21/4784* (2011.01)
*H04M 1/725* (2006.01)
*H04H 60/33* (2008.01)
*H04H 20/31* (2008.01)
*G07F 17/32* (2006.01)
*H04H 60/58* (2008.01)
*H04H 60/59* (2008.01)
*H04H 60/65* (2008.01)
*H04H 60/37* (2008.01)

(52) U.S. Cl.
CPC ..... *H04N 21/4784* (2013.01); *H04N 21/4882* (2013.01); *H04N 21/8173* (2013.01); *H04N 21/8186* (2013.01); *H04H 2201/50* (2013.01)

(56) References Cited

U.S. PATENT DOCUMENTS

2012/0295686 A1 11/2012 Lockton
2013/0268335 A1 10/2013 Cooper et al.

0b00

0b01

0b10

0b11

METHOD AND A DEVICE FOR SELECTING A PARTICIPATING DEVICE

This application claims the benefit, under 35 U.S.C. §119 of European Patent Application No. 14305115.9, filed Jan. 29, 2014.

TECHNICAL FIELD

The present principles relate generally to so-called second-screen systems and in particular to their application to interactive games.

BACKGROUND

This section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

For a few years, it has become increasingly common to see interactive games implemented using broadcast TV to display a challenge and remote devices (such as Smartphones or tablets) for the users to provide their answer to the challenge. It is then check whether the answer was correct and, if so, to deliver a reward of some kind. Usually, these systems use two techniques:
- synchronization technologies, such as audio watermarks or audio fingerprints, to inform the remote devices when the game starts, and
- a remote server that communicates with the remote devices to provide the challenge, to check whether the answer is correct, and possibly to deliver the reward.

It will be appreciated that this is a usual architecture for a second screen application.

U.S. Pat. No. 8,197,333 teaches a solution to implement scratching games that drastically reduces the use of remote server, but a server is nevertheless still needed.

It will thus be appreciated that it is desired to have a game that synchronizes with the main TV screen without using a return channel to a remote server. The present principles provide such a game.

SUMMARY

In a first aspect, the principles are directed to a method of selecting a participating device. A device receives an answer to a question from a user; captures a watermark rendered by a main screen; extracts a payload of the watermark, the payload comprising a correct answer to the question and a ratio value; compares the correct answer and the answer received from the user. If the correct answer is equal to the answer received from the user: the device generates a comparison value; compares the comparison value and a ratio value extracted from the payload; and, if the comparison between the comparison value and the ratio value indicates that the device has been selected, displays a message intended to a user.

In a first embodiment, if the comparison between the comparison value and the ratio value indicates that the device has been selected, the device generates and displays a proof value. It is advantageous that the device further sends the proof value and at least one identifier of the device or the user to a server. It is alternately advantageous that the proof value is based on a token value extracted from the payload, possibly by generating the proof value by applying a function to the token value and at least one of a present date and a present time.

In a second embodiment, the device further extracts a further payload from a further received watermark, the further payload comprising a layout type; and displays possible answers according to the layout type.

In a second aspect, the principles are directed to a device for participating in a selection of devices. The device comprises a processor configured to: receive an answer to a question from a user; capture a watermark rendered by a main screen; extract a payload of the watermark, the payload comprising a correct answer to the question and a ratio value; and compare the correct answer and the answer received from the user. If the correct answer is equal to the answer received from the user the device generates a comparison value; compares the comparison value and a ratio value extracted from the payload; and, if the comparison between the comparison value and the ratio value indicates that the device has been selected, display a message intended to a user on a display of the device.

In a first embodiment, the processor is further configured to, if the comparison between the comparison value and the ratio value indicates that the device has been selected, generate a proof value and to display the proof value on the display. It is advantageous that the processor is further configured to send the proof value and at least one identifier of the device or the user to a server. It is alternately advantageous that the proof value is based on a token value extracted from the payload, possibly by generating the proof value by applying a function to the token value and at least one of a present date and a present time.

In a second embodiment, the processor is further configured to extract a further payload from a further received watermark, the further payload comprising a layout type; and display possible answers according to the layout type.

In a third aspect, the principles are directed to a non-transitory computer-readable storage medium that stores instruction that, when executed by a processor, perform the method of the first aspect of the present principles.

BRIEF DESCRIPTION OF DRAWINGS

Preferred features of the present principles will now be described, by way of non-limiting example, with reference to the accompanying drawings, in which.

DESCRIPTION OF EMBODIMENTS

Figure 1:
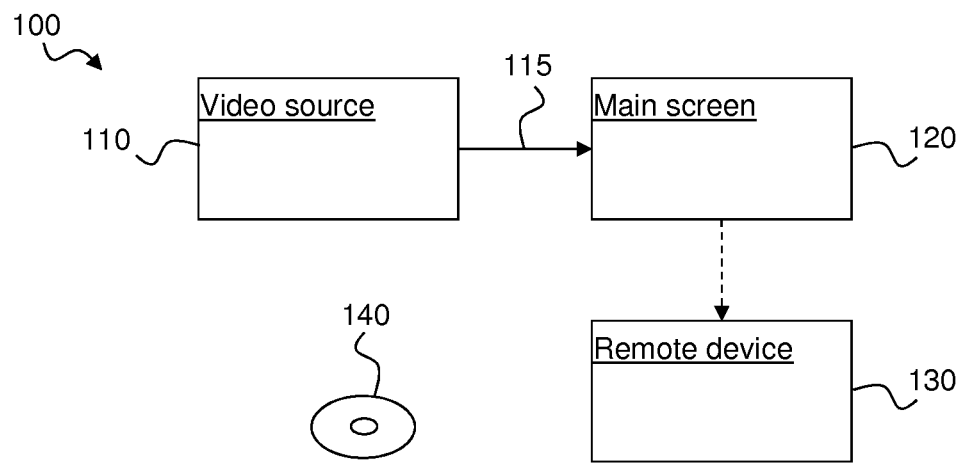
FIG. 1 illustrates an exemplary system according to the present principles.

FIG. 1 illustrates an exemplary system 100 according to the present principles. The system 100 comprises a video source 110 configured to transmit video 115. The video source can be a unit that broadcasts the video 115 or a video server that streams video 115 over the Internet. The system 100 also comprises a so-called main screen 120, which is configured to receive the video 115 from the video source and render the received video 115. While the principles can work with video only—i.e. without sound—it is advantageous that sound is used, in which case the main screen 120 renders both images and sound. The system 100 further comprises at least one remote device 130, for example a Smartphone or a tablet, configured to capture watermarks in the video rendered by the main screen 120 and executing an application implementing a game. It is advantageous that the watermarks are audio watermarks, but the principles would also work with video watermarks or a combination of audio and video watermarks. The video source 110, the main screen 120 and the remote device 130 comprise the hardware and software resources necessary for implementing the principles, such as for example processors, memory, input interfaces, output interfaces and user interfaces. It will however be appreciated that the video source 110 and the main screen 120 can be standard prior art equipment and that the remote device 130 can be a prior art device with the added game application that implements at least parts of the principles (while other parts can be implemented using already existing features such as a display and a microphone for capturing audio signals).

It will be appreciated that the video source 110 and the main screen 120 can be implemented in a single device. It will also be appreciated that it is advantageous for the video 115 to be watermarked so that the main screen 120 renders the watermark in the video 115, but it is also possible for the main screen 120 itself to insert the watermark in the video before rendering. Naturally, it is advantageous that the watermarks are at least partially, preferably totally, imperceptible to a user. As watermark is a mature technology well understood by the man skilled in the art, no detailed discussion of the technical aspects of watermarks is provided.

Thus, when working, the video source 110 transmits video 115 that is received and rendered by the main screen 120. The remote device 130 captures at least one watermark (preferably audio) in the rendered video and extracts information in the watermark.

A non-transitory computer-readable storage medium 140 stores computer code including instructions of the game application. When executed by a processor, these instructions perform the method of the present principles, an exemplary illustration of which is found in FIG. 4.

Figure 2:
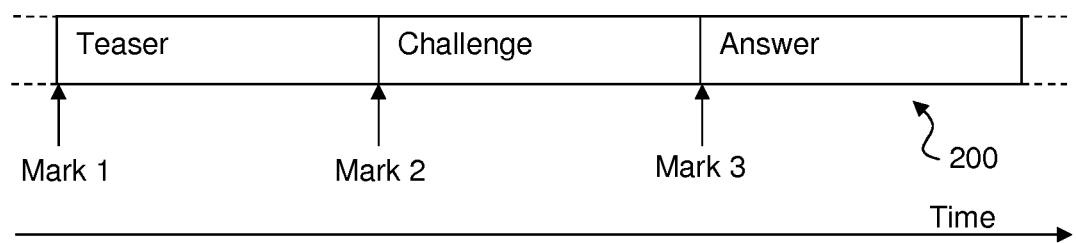
FIG. 2 illustrates an example of a series of watermarks embedded in a video signal according to the present principles.

FIG. 2 illustrates an example of a series of watermarks embedded in a video signal 200 as well as the sequencing of the watermarks:

Mark 1, which is optional, is inserted at the beginning of a teaser sequence for the game. The teaser sequence announces the upcoming game and may comprise a sequence to which the upcoming game is related.

Mark 2 is included in a challenge phase of the game, i.e. a phase during which the video displays a multiple choice question (preferably with the answers to choose from) and during which the user may provide the chosen answer. Mark 2 preferably carries information about the layout type for answering the question as well as a token value.

Mark 3, included when the video advantageously displays the correct answer, closes the answering time window and preferably carries: the correct response and a ratio value.

The game application on the remote device 130, which as mentioned is configured to extract the watermarks, preferably acts as follows:

Upon reception of Mark 1, it displays a message to alert the user that a question is imminent.

Upon reception of Mark 2, it displays a graphical layout in accordance with the received layout type and stores the token value. The graphical layout enables a user to input the chosen response. The game application then waits for the user to input the response or for Mark 3 to be extracted, whichever comes first.

Upon reception of Mark 3, it checks whether the input response matches the received, correct response. In case of a mismatch, i.e. wrong answer, it displays a corresponding message. In case of a match, i.e. correct answer, it generates a random number from a predetermined range (for example [0,1[or [1,100]). If the generated random number is higher (or, in a different implementation, lower) than the ratio value—or, put another way, if the generated random number falls in a range defined by the ratio value—then the game application displays a message to inform the user that the input answer was correct but that the user unfortunately was not polled, i.e. was not part of the winners. However, if the generated random number is in the ratio value range, then it displays a message that the user has won together with the token value that can be used for the user to redeem the prize.

To further illustrate the principles, a preferred embodiment for a simplified game will now be described. The teaser sequence comprises a video sequence that the user is intended to watch carefully. During the challenge sequence, the video sequence displays a question, advantageously relating to the previous teaser sequence, and offers a number of potential answers. Depending on the question, there may be 2 answers (labelled A to B), 4 answers (labelled A to D), 6 answers (labelled A to F) or 8 answers (labelled A to H). Naturally, the number of possible answers can also take other integer values. The answer sequence comprises the proper answer and possibly details relating to the teaser sequence.

In this description, 0b indicates binary representation and 0x hexadecimal representation of a following number. For example 0b10 means binary '10', i.e. 2 in decimal representation and 0x10 means hexadecimal '10', i.e. 16 in decimal representation.

The watermark technology used to watermark the video uses a 16-bit payload. Any of the numerous suitable prior art watermark techniques may be used (and the principles are likely to work with future watermarking techniques as well). As already mentioned, since watermarking is a mature technology, no detailed discussion about embedding of watermarks and extraction of watermark payloads will be provided.

The video source 110 transmits a video 115 comprising series of teaser sequences, challenge sequences and answering sequences. The video 115 is watermarked by any suitable device before it is rendered by the main screen 120.

The payload of Mark 1 has the following structure:

| B15 | B14 | B13 | B12 | B11 | B10 | B9 | B8 | B7 | B6 | B5 | B4 | B3 | B2 | B1 | B0 |
|-----|-----|-----|-----|-----|-----|----|----|----|----|----|----|----|----|----|----|
| 0   | 0   |     |     |     |     |    | Irrelevant |   |    |    |    |    |    |    |    |

In other words, if the two first bits of the payload are null, then the payload represents Mark 1, which announces the teaser.

The payload of Mark 2 has the following structure:

| B15 | B14 | B13 | B12 | B11 | B10 | B9 | B8 | B7 | B6 | B5 | B4 | B3 | B2 | B1 | B0 |
|-----|-----|-----|-----|-----|-----|----|----|----|----|----|----|----|----|----|----|
| 0 | 1 | Layout type | | | Token value | | | | | | | | | | |

In other words, if the two first bits of the payload are 0b01, then payload represents Mark 2. The following two bits carry the layout type whereas the 12 last bits carry the token value. As already mentioned, the layout type comprises information on how the remote device 130 is to display the possible responses, and the token value is different for each new challenge in order to discriminate the challenges and their corresponding rewards.

The payload of Mark 3 has the following structure:

| B15 | B14 | B13 | B12 | B11 | B10 | B9 | B8 | B7 | B6 | B5 | B4 | B3 | B2 | B1 | B0 |
|-----|-----|-----|-----|-----|-----|----|----|----|----|----|----|----|----|----|----|
| 1 | 0 | Correct answer | | | Ratio value | | | | | | Irrelevant | | | | |

In other words, if the two first bits of the payload are 0b10, then it represents Mark 3. The three following bits carry the correct answer and the 6 following bits carry the ratio value. The correct answer is coded as described by following table:

| Real Answer | A | B | C | D | E | F | G | H |
|-------------|---|---|---|---|---|---|---|---|
| Correct answer | 0x0 | 0x1 | 0x2 | 0x3 | 0x4 | 0x5 | 0x6 | 0x7 |

The ratio value is a value in the range [1, 1000]. As already mentioned, it could also be a value in [1, 100], and so on.

The remote device 130 captures the audio of the video rendered by the main screen 120 and extracts the watermark payload (as such well known to the skilled person). The extracted 16-bit payload is passed to the game application.

The game application first analyses the two first bits of the extracted payload:
- If the bits are 0b00, the game application displays on the screen of the remote device 130 a message announcing that the user should carefully watch the main screen 120.
- If the bits are 0b01, the game application analyses the value of the layout type and causes the screen of the remote device 130 to display the possible answers, e.g. A-D. This will be further described in FIG. 3. The game application also temporarily stores token value.

The user may provide an answer using the screen (or other means for input). For instance, if the remote device 130 has a touch screen, the user can simply press on the letter corresponding to the user's answer. The game application stores the input answer.

- If the bits are 0b10, the game application performs actions depending on the context:
  - If the user has not provided an answer to the present question, then the game application displays a message comprising the correct answer, e.g. 'C', and informs the user that no response was received.
  - If the user did provide an answer, then the game application checks whether the input answer is equal to the correct answer.

In case of no match, then the game application displays a message informing the user that the input answer was incorrect and also displays the correct answer.

In case of a match, then the game application generates a random value, in this example in the range 1 to 1000.

If the random value is greater than the ratio value, then the game application displays a message informing the user that the input answer was correct, but that the user nevertheless was not polled—better luck next time.

Else, the game application displays a message informing the user that he has won. The game application also applies a function to the current date or current time (or both) and the memorized token value. The resulting value is then displayed, possibly as a numerical value, but it is also possible to display the resulting value as a machine-readable value such as a bar code or a QR code. The displayed resulting value can then be used to prove to staff members that the user has won. The resulting value is thus based on the token value—they may also be identical.

It will be readily understood that the present principles can be used for queue control, advantageously at an amusement park. For instance, when there is a long queue to an attraction, but few or no people at the privileged entrance to the attraction, then the prize can be the right to use the privileged entrance. This way, the principles can be used, to a certain extent, to control the flow of people in a given area. It is naturally also possible to entice people waiting for a popular attraction to 'win' the right to access a different attraction, thereby diminishing the queue at the popular attraction.

Figure 3:
FIG. 3 illustrates examples of layout types corresponding to the layout type of the present principles.
Figure 3:
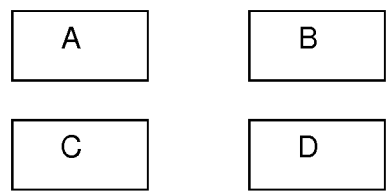
Figure 3:
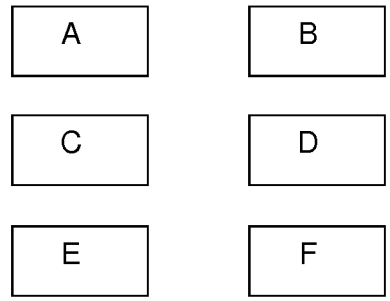
Figure 3:
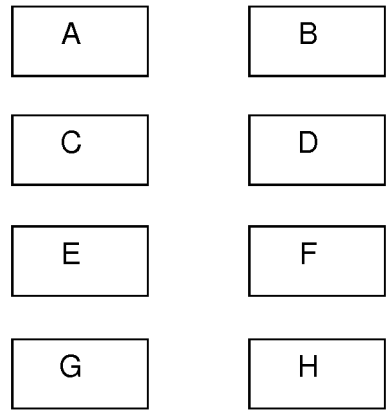

FIG. 3 illustrates examples of layout types corresponding to the layout type. In the example hereinbefore, the layout type was coded as two bits, making it possible to transmit four different values. The example further gave examples as 2, 4, 6 and 8 responses. FIG. 3 thus illustrates these four different possibilities: to the left is the layout type value and the corresponding layout may be seen to the right. From the top down: 0b00 is a first layout with two possible answers (A, B), 0b01 is a second layout with four possible answers (A, B, C, D), 0b10 is a third layout with six possible answers (A, B, C, D, E, F) and 0b11 is a fourth layout with eight possible answers.

Figure 4:
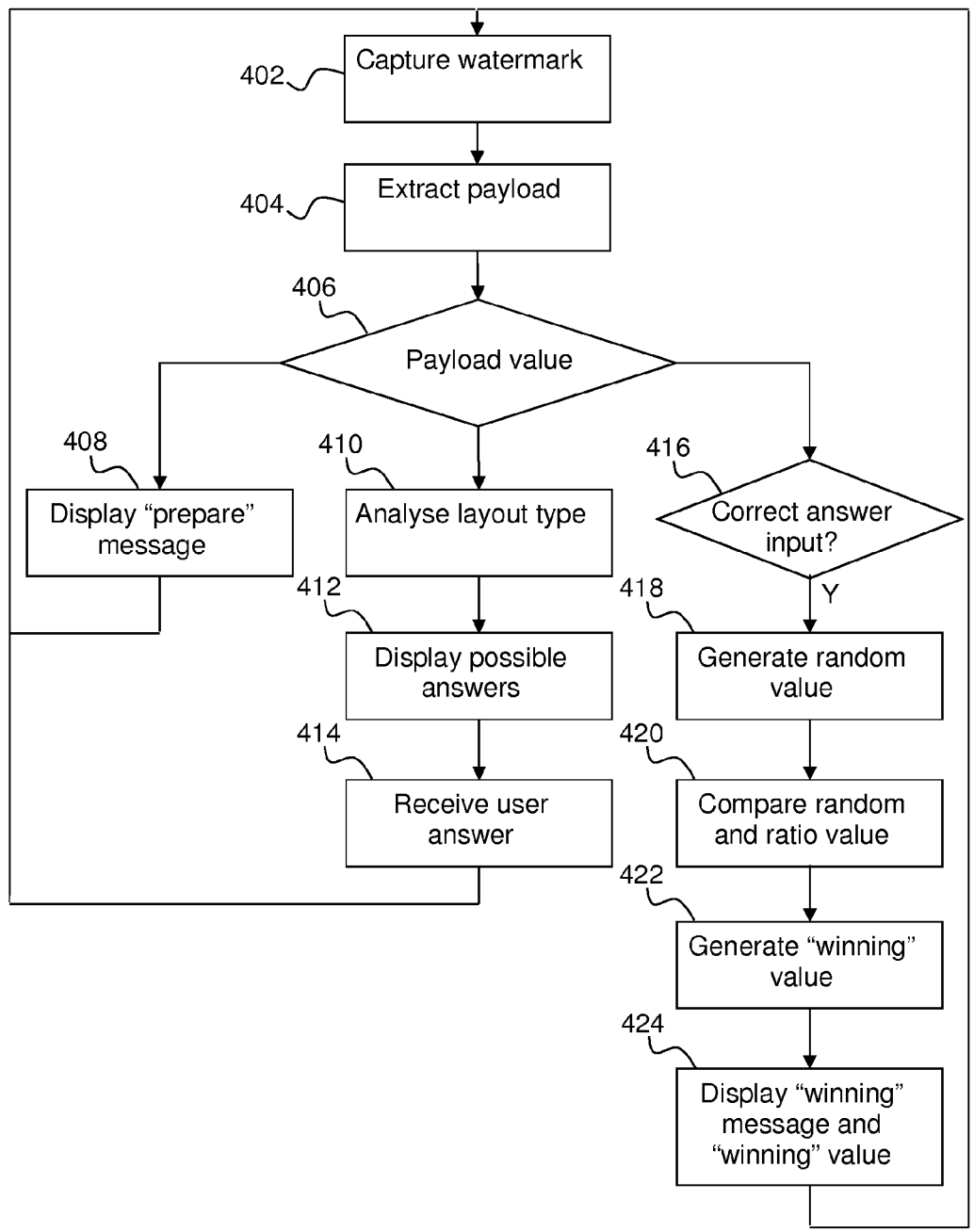
FIG. 4 illustrates an exemplary method according to the present principles.

FIG. 4 illustrates an exemplary method according to the present principles. The remote device 130 captures 402 a watermark and extracts 404 its payload. Depending on the payload value 406 the remote device 130 may go down different branches, as already described. In this example flow chart, not all possibilities are illustrated, only those that the method actually goes through.

First the remote device 130 receives a first payload whose first two bits equal 0b00, which causes the remote device 130 to display 408 a "prepare" message on its display. The method then returns to step 402 until a new watermark arrives.

The remote device 130 then receives a second payload whose first two bits equal 0b01 and analyses 410 the layout type in the payload, displays 412 the possible answers in accordance with the layout type, and, as will be assumed in this example, receives 414 an answer from the user. After this, the method then returns to step 402 until a new watermark arrives.

The remote device 130 finally receives a third payload whose first two bits equal 0b10. The remote device 130 then checks 416 if the user input the correct answer by comparing the answer received in step 414 with the correct answer included in the third payload—in the example, it is assumed that the user input the correct answer (and thus only the "Yes" branch is illustrated). The remote device 130 then generates 418 a random value, compares 420 the generated random value with a ratio value extracted from the third payload. If, as assumed in this example, the comparison shows that the user has won, the remote device 130 generates 422 a "proof" value as already described ("resulting value") and displays 424 a "winning" message and the "winning" value on its display.

It will be appreciated that the method then can stop or continue with a further question sequence.

The principles work with offline watermarked content, in which case the ratio value will be constant. Live watermark embedding can allow adjustments to the number of winners for instance to take into account the number of users: the higher the number of players, the higher the ratio.

It should be noted that if the bandwidth of the watermarking technology is sufficient, then it is also possible for the remote device 130 to capture and display at least one of the entire question and the entire answers (i.e. not just 'A', 'B' etc.).

The expression "random value" is intended to comprise both a truly random value and a pseudo-random value.

It will be appreciated that an advantage of the present principles is that no server is needed to select the winners. In addition, the adjustable ratio value allows some flexibility as to the number of winners.

The present principles can thus provide an interactive game that does not need any server to handle the users' responses.

It will however be appreciated that the present principles also can be implemented with a 'back channel', i.e. a connection between the remote device and a server. A possible implementation of this is to have the remote device send the proof value and at least one identifier of the user and or the remote device to a server—
if this is made by, for example, including these in a SMS, then the solution nevertheless minimizes the communications between remote devices and the server.

Each feature disclosed in the description and (where appropriate) the claims and drawings may be provided independently or in any appropriate combination. Features described as being implemented in hardware may also be implemented in software, and vice versa. Reference numerals appearing in the claims are by way of illustration only and shall have no limiting effect on the scope of the claims.

The invention claimed is:

1. A method in a device comprising a processor of selecting a participating device, the method comprising:
   receiving an answer to a question;
   capturing a watermark rendered by a main screen;
   extracting a payload of the watermark, the payload comprising a correct answer to the question and a ratio value;
   comparing the correct answer and the answer received;
   when the correct answer is equal to the answer received, generating a random value;
   comparing the random value and the ratio value extracted from the payload; and
   when the comparison between the random value and the ratio value indicates that the device has been selected, displaying a message.

2. The method of claim 1, further comprising, in case the comparison between the random value and the ratio value indicates that the device has been selected, generating a proof value, and wherein the displaying further comprises displaying the proof value.

3. The method of claim 2, further comprising sending the proof value and at least one device identifier or user identifier to a server.

4. The method of claim 2, wherein the proof value is based on a token value extracted from the payload.

5. The method of claim 4, wherein the proof value is generated by applying a function to the token value and at least one of a present date and a present time.

6. The method of claim 1, further comprising:
   extracting a further payload from a further received watermark, the further payload comprising a layout type; and
   displaying possible answers according to the layout type.

7. A device for participating in a selection of devices, the device comprising:
   a display;
   a processor to:
      receive an answer to a question;
      capture a watermark rendered by a main screen;
      extract a payload of the watermark, the payload comprising a correct answer to the question and a ratio value;
      compare the correct answer and the answer received;
      when the correct answer is equal to the answer received, generate a random value;
      compare the random value and the ratio value extracted from the payload; and
      when the comparison between the random value and the ratio value indicates that the device has been selected, display a message on the display.

8. The device of claim 7, wherein the processor to further send a proof value and at least one device identifier or user identifier to a server.

9. The device of claim 7, wherein when the comparison between the random value and the ratio value indicates that the device has been selected, the processor is to further generate a proof value and to display the proof value on the display.

10. The device of claim 9, wherein the proof value is based on a token value extracted from the payload.

11. The device of claim 10, wherein the processor to further generate the proof value by applying a function to the token value and at least one of a present date and a present time.

12. The device of claim 7, wherein the processor to further:

extract a further payload from a further received watermark, the further payload comprising a layout type; and display possible answers according to the layout type.

13. A non-transitory computer-readable storage medium comprising instructions that, when executed by a processor, cause the processor to:

receive an answer to a question;

capture a watermark rendered by a main screen;

extract a payload of the watermark, the payload comprising a correct answer to the question and a ratio value;

compare the correct answer and the answer received;

when the correct answer is equal to the answer received, generate a random value;

compare the random value and the ratio value extracted from the payload; and when the comparison between the random value and the ratio value indicates that a participating device has been selected, display a message on a display of the participating device.

* * * * *